United States Patent [19]

Eustache et al.

[11] Patent Number: 4,777,468
[45] Date of Patent: Oct. 11, 1988

[54] AUTOMOBILE BURGLARY DETECTING CIRCUIT

[75] Inventors: Dominique Eustache, Beverly Hills, Calif.; Rene Soum; Pierre Granel, both of Toulouse, France; Richard Rich, Pacific Palisades, Calif.

[73] Assignee: Rich & Ezer, A Law Corporation, Los Angeles, Calif.

[21] Appl. No.: 911,873

[22] Filed: Sep. 26, 1986

[51] Int. Cl.[4] .............................................. B60R 25/00
[52] U.S. Cl. ...................................... 340/63; 340/538; 340/310 A
[58] Field of Search ................... 340/63, 538, 310 A, 340/531; 307/10 AT, 10 R

[56] References Cited

U.S. PATENT DOCUMENTS

| | | |
|---|---|---|
| 2,842,753 | 7/1958 | Ewen ............................ 340/518 X |
| 3,671,934 | 6/1972 | Teich ................................. 340/63 |
| 3,703,714 | 11/1972 | Andrews . |
| 3,706,966 | 12/1972 | So et al. ............................ 340/63 |
| 3,815,088 | 6/1974 | Kumpfbeck et al. .............. 340/63 |
| 3,833,895 | 9/1974 | Fecteau . |
| 3,845,361 | 10/1974 | Watase et al. . |
| 3,858,175 | 12/1974 | Kopera, Jr. . |
| 3,930,226 | 12/1975 | Plumberg . |
| 3,956,732 | 5/1976 | Teich . |
| 3,987,408 | 10/1976 | Sassover et al. . |
| 4,037,194 | 7/1977 | Boyden et al. .................... 340/63 |
| 4,067,411 | 1/1978 | Conley et al. . |
| 4,099,157 | 7/1978 | Enabnit ........................ 340/538 X |
| 4,101,873 | 7/1978 | Anderson et al. . |
| 4,104,694 | 8/1978 | Hargrove . |
| 4,141,010 | 2/1979 | Umpleby et al. . |
| 4,143,368 | 3/1979 | Route et al. . |
| 4,159,467 | 6/1979 | Ballin . |
| 4,218,655 | 8/1980 | Johnston et al. ............ 340/310 A X |
| 4,232,288 | 11/1980 | Masterman ........................ 340/63 |
| 4,258,352 | 3/1981 | Lipschultz . |
| 4,327,444 | 4/1982 | Court . |
| 4,383,242 | 5/1983 | Sassover et al. . |
| 4,463,340 | 7/1984 | Adkins et al. ................ 340/538 X |
| 4,463,341 | 7/1984 | Iwasaki ........................ 340/310 A |

FOREIGN PATENT DOCUMENTS 0078962  5/1983  European Pat. Off. .
2449771  2/1980  France .

OTHER PUBLICATIONS

"Pulsafe Vehicle Security System", brochure, (circa 1984).

Primary Examiner—Joseph A. Orsino, Jr.
Assistant Examiner—Brian R. Tumm
Attorney, Agent, or Firm—Poms, Smith, Lande & Rose

[57] ABSTRACT

An automobile burglary detecting circuit for use with an automobile electrical system having an electrical accessory activated by a switch. The detecting circuit also includes a signal generator for imposing an oscillating signal on the electrical system, and a signal detector which detects the signal from the system. An alternative embodiment includes a further signal generator which is responsive to the signal detector, and which imposes a second oscillating signal on the electrical system. The second oscillating signal is detected by a filter which activates an alarm.

1 Claim, 2 Drawing Sheets

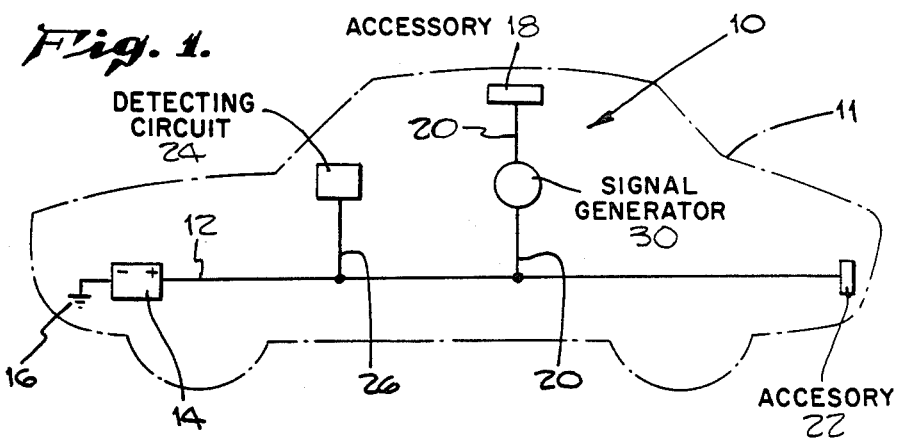
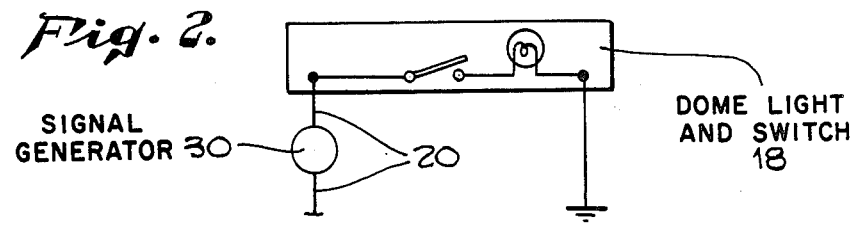
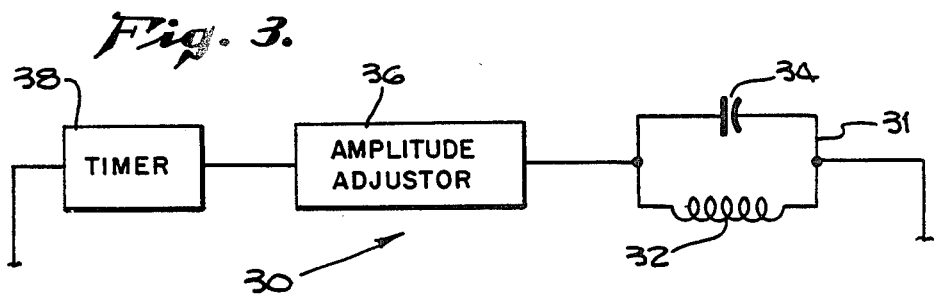
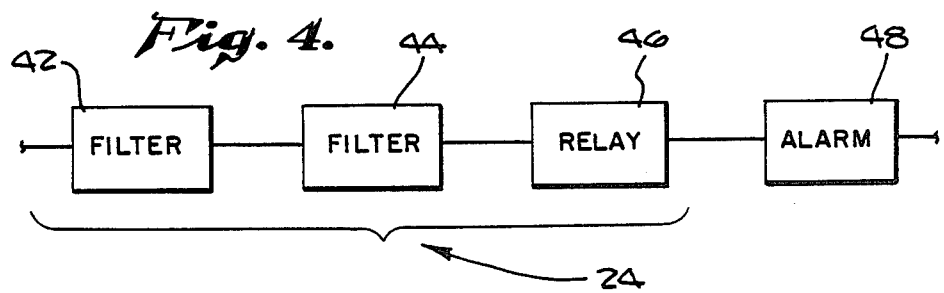

AUTOMOBILE BURGLARY DETECTING CIRCUIT

FIELD OF THE INVENTION

This invention relates generally to automobile burglary detecting circuits and in particular to those which use existing vehicle wiring.

BACKGROUND OF THE INVENTION

Theft and vandalism of automobiles is a significant problem in the United States. Heretofore, numerous devices have been developed to prevent unauthorized use of motor vehicles. One such device is described in U.S. Pat. No. 3,930,226 by Leonard G. Plumberg. That system is activated when one of the switches in the in-dome light circuit (e.g., door switches) is closed which causes the system to be grounded. Other systems known in the art function by detecting a voltage drop due to, for example, the dome light being switched on upon the door opening.

In these systems, false alarms are often created by the switching on of certain accessories such as fans, clocks, and onboard trip computers, even after the vehicle has been completely turned off. Thus, the current systems have become more complex due to the necessity of connecting the alarm's central unit directly to the particular accessories from which one wants to locate an electrical disturbance. Installing the corresponding wires inside each vehicle compartment, and between these compartments and the alarm's central unit, requires numerous drillings of the separation walls, and turns out to be lengthy, difficult and costly.

Accordingly, it is the principal object of this invention to reduce the complexity of automobile burglary detecting systems. Another object is to simplify the installation of burglary systems.

SUMMARY OF THE INVENTION

The present invention in a broad aspect is an automobile burglary detecting circuit for use with an automobile electrical system having an electrical accessory activated by a switch. The detecting circuit also includes a signal generator for imposing an oscillating signal on the electrical system, and a signal detector which detects the signal from the system.

The signal generator includes an oscillator, which can be made of a coil and capacitor, or of a microprocessor, and a signal amplitude adjustor which adjusts the amplitude of the voltage of the signal such that it is higher than a threshold voltage. The threshold voltage is higher than any of the voltage levels of the harmonics of the signals transmitted by the vehicle accessories. The signal includes a frequency located outside of the various frequencies transmitted by the accessories, the has a time period long enough to be distinctive from random disturbances. The signal generator is activated in response to electrical changes in the accessory, or to the accessory switch.

The signal detector includes at least one filter and amplifier. The signal detector filters out all signals with amplitudes lower than the threshold value. Upon detecting the signal from the electrical system, the signal detector activates an alarm.

This system can be used with more than one automobile accessory where each accessory has a signal generator attached to it. Each generator can generate at the same frequency or at different frequencies. In order to avoid mutual neutralization of the signals generated upon a burglary associated with more than one accessory, the signal detector can include more than one filter for detecting signals of different frequencies. If the signal generators all generate at the same frequency, then the generators can also include timing systems which allow intermittent signal generation to avoid confusion.

Other objects, features and advantages of the present invention will become apparent from consideration of the following detailed description and from the accompanying drawings.

BRIEF DESCRIPTION OF THE DRAWINGS

FIG. 1 shows a diagramatic view of the automobile burglary detection circuit according to the present invention in an automobile;

FIG. 2 shows a circuit diagram of the accessory and signal generator circuit of FIG. 1;

FIG. 3 shows the signal generator components of the signal generator of FIG. 2;

FIG. 4 shows the signal detecting circuit and alarm for the circuit of FIG. 1;

DETAILED DESCRIPTION

Figure 5:
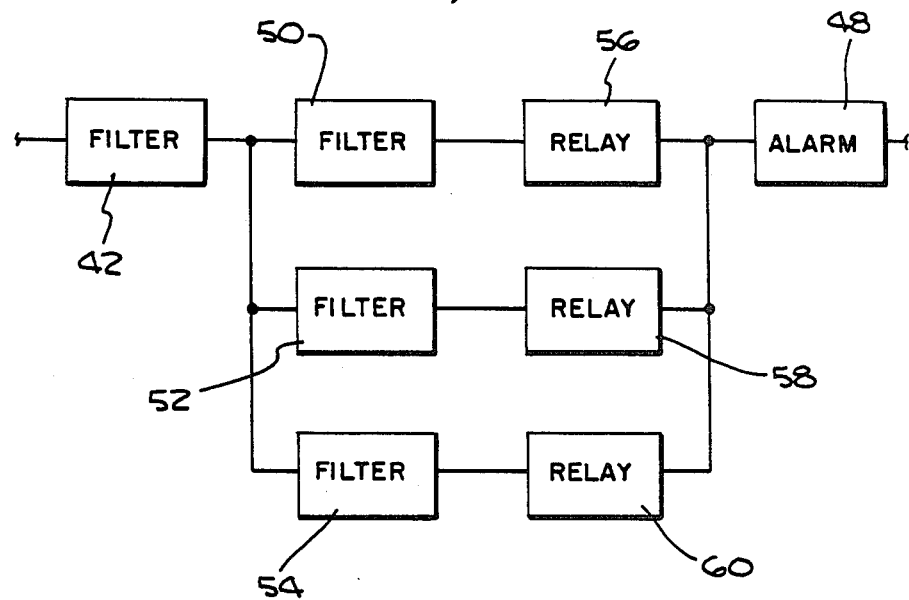
FIG. 5 shows the signal detecting circuit according to the present invention for multiple accessories.

FIG. 1 shows the automobile burglary detecting circuit 10 according to the present invention in an automobile 11. The automobile includes electrical system 12 which is connected to automobile battery 14 which is turn is connected to ground 16. Automibile accessories include dome light 18 and trunk light indicator 22 which are both connected to electrical system 12. The signal detecting circuit 24 is connected to electrical system 12 by lead 26, and signal generator 30 is connected to electrical system 12 by lead 20. Signal detecting circuit 24 may be located in any location of the automobile.

The principal components of the present invention are signal generator 30 which is shown in detail in FIG. 3, and is connected to electrical system 12 by way of lead 20 as shown in FIG. 2, and signal detecting circuit 24 which is shown in detail in FIGS. 4 and 5, and is connected to electrical system 12.

FIG. 2 shows the interconnections of accessory 18 and signal generator 30 is more detail. Signal generator 30 is connected to leads 20 which allow a signal from signal generator 30 to be imposed on electrical system 12. Signal generator 30 can respond to changes in voltage of accessory 18 in a way that will be appreciated by those of ordinary skill in the art. The circuitry of the present invention is conventional and may be designed by one of ordinary skill. For this reason, the circuitry is shown in block form.

FIG. 3 shows signal generator 30 in more detail. Signal generator 30 includes an oscillator 31 made of coil 32 and capacitor 34. Oscillator 31 may also be a programmed microprocessor. The period of the oscillating signal produced by the oscillator is of a duration long enough to be distinctive from random disturbances, such as contact bounce at the door switches. Signal generator 30 includes a signal amplitude adjustor 36 which preferably is a resistor. The amplitude adjustor 36 adjusts the voltage of the oscillating signal by, for example, modulating a resistor, so that the signal amplitude is greater than a threshold level which is greater than the voltage amplitude of the various harmonics from the accessories.

In order to be able to detect the oscillating signal, the oscillation frequency should be located outside of the various frequencies imposed on the DC automobile circuitry by the vehicle automatic accessories. This is obtained by modifying the ratio of the capacitance from the capacitor 34 and the inductance of the coil 32, and possibly including the addition of resistance, or by modifying the program of the microprocessor oscillator.

FIG. 4 shows the signal detecting circuit 24. Filter 42 is a level detection filter for eliminating, for the frequency of the oscillating signal, any voltage amplitudes smaller than the threshold level. The designing of such filters, similar to the ones frequently encountered in radio receivers to eliminate background noise, is common and known. Filter 44 is responsive to the particular frequency of the signal generator 30. When the filter 44 has received the correct frequency it activates relay 46 which in turn activates alarm 48. Alarm 48 may include a horn, siren, lights and other similar devices.

The automobile burglary detecting circuit can be used to detect the activation of more than one automobile accessory circuit. In this case, a separate signal generator is associated with each accessory. If each of the signal generators associated with an accessory generates at the same frequency, the overlapping signals may cause mutual neutralization. To avoid this, timer 38 causes the generators 30 to generate intermittently in order that only one signal is one electrical system 12 at a given time. Timer 38 can be made of bimetallic strip type or be of an electronic type. If the timer is electronic, this is obtained by the addition of resistance or by a program according to known techniques.

It may be desirable to known which accessory has been subject to a burglary. This is made possible by each signal generator generating a signal distinctive from all other signals. These signals are differentiated by filters 50, 52 and 54 shown in FIG. 5. When any of these filters is activated it will in turn activate relays 56, 58 or 60 respectively which in turn will activate alarm 48 and indicate which filter has been activated.

Figure 6:
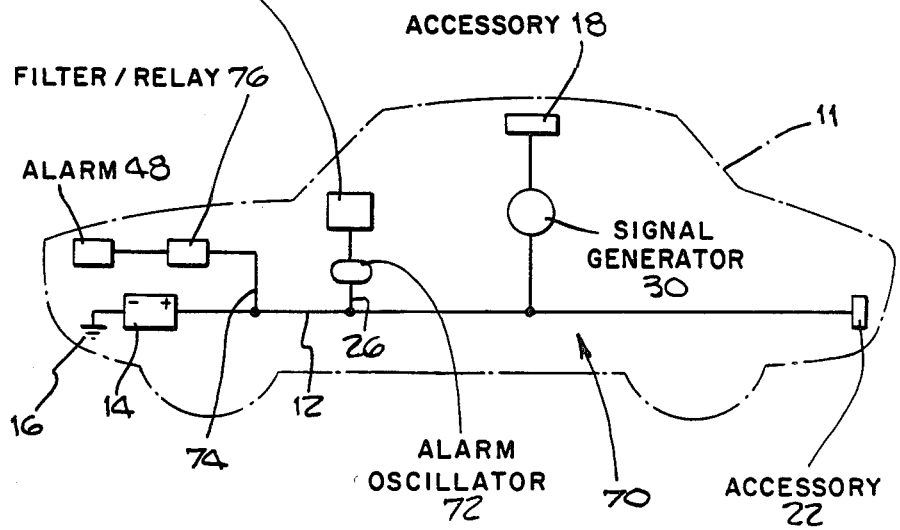
FIG. 6 shows an alternative embodiment of the automobile burglary detection circuit according to the present invention in an automobile.

FIG. 6 shows an alternative embodiment of the automobile detecting circuit 70. The circuit 70 is the same as circuit 10 of FIG. 1 except that it is further provided with an alarm oscillator 72 which creates an alarm oscillating signal in response to the signal detecting circuit 24 being activated. The alarm oscillating signal of alarm oscillator 72 is imposed on the electrical system 12 by lead 26. Alarm filter/relay 76 is connected to the electrical system 12 by lead 74, and activates alarm 48 in response to detecting the alarm oscillating signal.

The burglary detecting circuit includes a disabling circuit which disables the burglary detecting circuit when the automobile ignition is on. Such disabling circuits are well known in the art.

It is possible to add to the vehicle additional accessories such as shock detectors, ultrasonic or hyperfrequency or infrared volumetric detectors. This list need not be limited. In order to detect a burglary, it is sufficient to connect signal generators between the appropriate terminals of these additional accessories, whose signals will be transmitted as soon as a burglary will take place, thus said signal will be propagated in the circuit and will be detected. Accordingly, the invention is not limited to the particular arrangement which is illustrated and described in detail, or shown in the drawings.

What is claimed is:

1. An automobile burglary detecting circuit for use with an automobile electrical system having an automobile electrical accessory activated by a switch, comprising:
    signal generating means coupled to said electrical system for imposing an oscillating signal on said system;
    signal detecting means for detecting said signal;
    alarm oscillator means coupled to said signal detecting means for imposing an alarm oscillating signal onto said electrical system; and
    alarm filter means for detecting said alarm oscillating signal and activating an alarm.

* * * * *